(12) United States Patent
Torrini et al.

(10) Patent No.: US 10,700,901 B1
(45) Date of Patent: Jun. 30, 2020

(54) ANGLE OF ARRIVAL CARRIER FREQUENCY OFFSET CORRECTION

(71) Applicant: Silicon Laboratories Inc., Austin, TX (US)

(72) Inventors: Antonio Torrini, Austin, TX (US); Joel Kauppo, Espoo (FI); Sauli Johannes Lehtimaki, Nummela (FI)

(73) Assignee: Silicon Laboratories, Inc., Austin, TX (US)

( * ) Notice: Subject to any disclaimer, the term of this patent is extended or adjusted under 35 U.S.C. 154(b) by 0 days.

(21) Appl. No.: 16/587,248

(22) Filed: Sep. 30, 2019

(51) Int. Cl.
*H03K 9/00* (2006.01)
*H04L 27/00* (2006.01)

(52) U.S. Cl.
CPC .. *H04L 27/0014* (2013.01); *H04L 2027/0026* (2013.01)

(58) Field of Classification Search
CPC ......... H04L 27/0014; H04L 2027/0026; H04L 27/2647; H04L 1/20; H04N 5/4401; H04B 1/30; H04B 1/28
USPC ......................................... 375/316, 295, 219
See application file for complete search history.

(56) References Cited

U.S. PATENT DOCUMENTS

2018/0070205 A1* 3/2018 Berger .............. H04W 56/0065

* cited by examiner

*Primary Examiner* — Zewdu A Kassa
(74) *Attorney, Agent, or Firm* — Nields, Lemack & Frame, LLC

(57) ABSTRACT

A system and method for detecting and compensating for carrier frequency offset is disclosed. This system compensates for CFO and calculates a corrected phase. This corrected phase may be used by, for example, an AoX algorithm, such as MUSIC, to more accurately determine the angle of arrival or angle of departure of a signal. In certain embodiments, the system oversamples the incoming signal to create a plurality of samples. The system then determines the phase of each of the plurality of samples and calculates the carrier frequency based on the time derivative of the phase. In certain embodiments, a particular portion of an incoming packet is used to determine the carrier frequency offset. In other embodiments, the system calculates the carrier frequency offset throughout an entirety of the incoming packet. Once the carrier frequency offset is determined, it can be used to adjust the received signals. These adjusted signals are then used to determine the angle of arrival or angle of departure.

18 Claims, 12 Drawing Sheets

ANGLE OF ARRIVAL CARRIER FREQUENCY OFFSET CORRECTION

This disclosure describes systems and methods for detecting and compensating for carrier frequency offset (CFO), and more particularly compensating for CFO to improve Angle of Arrival and Angle of Departure algorithm performance.

BACKGROUND

Angle of Arrival and Angle of Departure algorithms, collectively referred to as AoX algorithms, operate by determining a phase difference between different antenna elements in an antenna array. This phase difference can be used to determine the angle from which the signal originated, since the distance between antenna elements is known.

Specifically, assume the distance between two adjacent antenna elements is d. The phase difference between when the incoming signal is detected at these two adjacent antennas can be given as φ. This phase difference, φ, divided by 2π, multiplied by the wavelength, λ, represents the distance between the two antenna elements, as viewed from the signal source. Knowing this difference in the distance that the incoming signal traveled allows the angle of arrival to be calculated. Specifically, the angle of arrival can be given by the difference in the distance that the incoming signal traveled, divided by d represents the cosine of the incoming signal. In other words, the angle of arrival is defined as the arc cosine of (φλ/2π)/d.

This algorithm, and others, relies on the accuracy of several parameters. Specifically, the distance between adjacent antenna elements must be accurate. This is typically not problematic, as the antenna array is well defined. The algorithm also relies on the accuracy of the wavelength of the incoming signal.

Specifically, the phase is determined based on a calculation based on the frequency. If the frequency is incorrect, the phase will also be inaccurate.

Unfortunately, frequency inaccuracy is common. Crystals that are used in network devices to generate the carrier frequency typically have a tolerance of ±20 ppm. If the carrier frequency is 2.4 Ghz, this implies a carrier frequency offset that can be as large as 48 kHz.

Thus, two network devices can have a relative carrier frequency offset of up to 96 kHz. This difference in carrier frequency can affect the AoX algorithm, resulting in less accurate results than desired.

Therefore, it would be beneficial if there were a system and method where the CFO can be determined and compensated for. In this way, the accuracy of the AoX algorithm can be improved. Further, it would be beneficial if this system and method can be easily incorporated into existing AoX algorithms.

SUMMARY

A system and method for detecting and compensating for carrier frequency offset is disclosed. This system compensates for CFO and calculates a corrected phase. This corrected phase may be used by, for example, an AoX algorithm, such as MUSIC, to more accurately determine the angle of arrival or angle of departure of a signal. In certain embodiments, the system oversamples the incoming signal to create a plurality of samples. The system then determines the phase of each of the plurality of samples and calculates the carrier frequency based on the time derivative of the phase. In certain embodiments, a particular portion of an incoming packet is used to determine the carrier frequency offset. In other embodiments, the system calculates the carrier frequency offset throughout an entirety of the incoming packet, the constant tone extension or both. Once the carrier frequency offset is determined, it can be used to adjust the received signals. These adjusted signals are then used to determine the angle of arrival or angle of departure.

According to one embodiment, a device to calculate an angle of arrival or an angle of departure is disclosed. The device comprises a wireless network interface, wherein the wireless network interface receives an incoming signal and generates an I signal and a Q signal; a processing unit; a memory device, comprising instructions, which when executed by the processing unit, enable the device to: receive a packet that includes a constant tone extension (CTE), wherein the CTE comprises a tone having a known frequency and wherein the CTE comprises a guard period, a reference period, a plurality of switch slots and a plurality of sample slots; sample the CTE a plurality of times during at least a portion of the guard period and the reference period and compute the phase of each sample, using a sample rate that is at least 8 times the known frequency; calculate a phase of each sample, wherein the phase is defined as arctan(I/Q), and compile the plurality of the phases to form a phase signal; compute an initial frequency ($F_{init}$) of the tone based on the phase signal; use $F_{init}$ to determine a calculated frequency for each sample slot of the CTE; store a plurality of I and Q signals, where one I signal and one Q signal is stored during each sample slot; and compensate for a difference between the known frequency and the calculated frequency by modifying the plurality of stored I and Q signals using the calculated frequency to create a plurality of compensated I and Q signals; and using the plurality of compensated I and Q signals as inputs to an AoX algorithm. In certain embodiments, the memory device further comprises instructions, which when executed by the processing unit, enable the device to: sample the CTE during each sample slot, wherein the sample rate is at least 8 times the known frequency; calculate a phase of each sample, wherein the phase is defined as arctan(I/Q), and compile the plurality of the phases into the phase signal; compute a frequency of the tone during each sample slot of i slots, based on the phase signal, wherein the frequency of the tone during an ith sample slot is referred to as F(i); and wherein a determination of the calculated frequency for the ith sample slot is made using F(i). In certain embodiments, the determination of the calculated frequency for ith sample slot is made using a weighted average of calculated frequencies of two or more sample slots. In some embodiments, the determination of the calculated frequency for ith sample slot is made using F(i−1). In certain embodiments, the device comprising an antenna array comprising a plurality of antenna elements and the memory device further comprises instruction that enable the device to: select a different antenna element during each switch slot. In certain embodiments, the initial frequency is calculated by determining a slope of the phase signal. In certain embodiments, the initial frequency is calculated by determining a period of the phase signal.

According to another embodiment, a device to calculate an angle of arrival or an angle of departure is disclosed. The device comprises a wireless network interface, comprising a dual polarized antenna wherein the wireless network interface receives an incoming signal and generates an I signal and a Q signal; a processing unit; a memory device, comprising instructions, which when executed by the processing unit, enable the device to: receive a packet that includes a constant tone extension (CTE), wherein the CTE comprises a tone having a known frequency and wherein the CTE comprises a guard period, a reference period, a plurality of switch slots and a plurality of sample slots; sample the CTE during each sample slot to obtain a plurality of sampled I and Q signals, wherein a first sample is collected using a first polarization of the dual polarized antenna and a second sample is collected using a second polarization of the dual polarized antenna; calculate a phase of the first sample and the second sample, wherein the phase is defined as arctan (I/Q); calculate a phase error between the first sample and the second sample; use the phase error to calculate a carrier frequency offset; compensate for a difference between the known frequency and an actual frequency of the tone by modifying a plurality of stored I and Q signals using the calculated carrier frequency offset to create a plurality of compensated I and Q signals; and using the plurality of compensated I and Q signals as inputs to an AoX algorithm. In certain embodiments, the memory device further comprises instructions, which when executed by the processing unit, create the plurality of stored I and Q signals by: sampling the CTE a plurality of times during at least a portion of the guard period and the reference period and computing the phase of each sample, using a sample rate that is at least 8 times the known frequency; calculating a phase of each sample and compiling the plurality of the phases to form a phase signal; computing an initial frequency ($F_{init}$) of the tone based on the phase signal; using $F_{init}$ to determine a calculated initial carrier frequency offset; and modifying the plurality of sampled I and Q signals using the calculated initial carrier frequency offset to create the plurality of stored I and Q signals. In certain embodiments, the initial frequency is calculated by determining a slope of the phase signal. In certain embodiments, the initial frequency is calculated by determining a period of the phase signal. In certain embodiments, the carrier frequency offset is determined by dividing the phase error by a time between the first sample and the second sample, wherein the phase error is defined as a difference in the phase of the first sample and the second sample, less 90°. In certain embodiments, the memory device further comprises instructions, which when executed by the processing unit: store the sampled I and Q signals to create the plurality of stored I and Q signals.

According to another embodiment, a device to calculate an angle of arrival or an angle of departure is disclosed. The device comprises a wireless network interface, comprising a plurality of antenna elements, wherein the wireless network interface receives an incoming signal and generates an I signal and a Q signal; a processing unit; a memory device, comprising instructions, which when executed by the processing unit, enable the device to: receive a packet that includes a constant tone extension (CTE), wherein the CTE comprises a tone having a known frequency and wherein the CTE comprises a guard period, a reference period, a plurality of switch slots and a plurality of sample slots; sample the CTE during each sample slot to obtain a plurality of sampled I and Q signals, wherein samples are collected using different antenna elements, and wherein a number of sample slots is greater than a number of antenna elements, such that one antenna element is used to sample at least a first sample and a second sample from different snapshots; calculate a phase of the first sample and the second sample, wherein the phase is defined as arctan(I/Q); calculate a phase error between the first sample and the second sample; use the phase error to calculate a carrier frequency offset; compensate for a difference between the known frequency and an actual frequency of the tone by modifying a plurality of stored I and Q signals using the calculated carrier frequency offset to create a plurality of compensated I and Q signals; and using the plurality of compensated I and Q signals as inputs to an AoX algorithm. In certain embodiments, the memory device further comprises instructions, which when executed by the processing unit, create the plurality of stored I and Q signals by: sampling the CTE a plurality of times during at least a portion of the guard period and the reference period and computing the phase of each sample, using a sample rate that is at least 8 times the known frequency; calculating a phase of each sample and compiling the plurality of the phases to form a phase signal; computing an initial frequency ($F_{init}$) of the tone based on the phase signal; using $F_{init}$ to determine a calculated initial carrier frequency offset; and modifying the plurality of sampled I and Q signals using the calculated initial carrier frequency offset to create the plurality of stored I and Q signals. In certain embodiments, the initial frequency is calculated by determining a slope of the phase signal. In certain embodiments, the initial frequency is calculated by determining a period of the phase signal. In certain embodiments, the memory device further comprises instructions, which when executed by the processing unit: store the sampled I and Q signals to create the plurality of stored I and Q signals.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
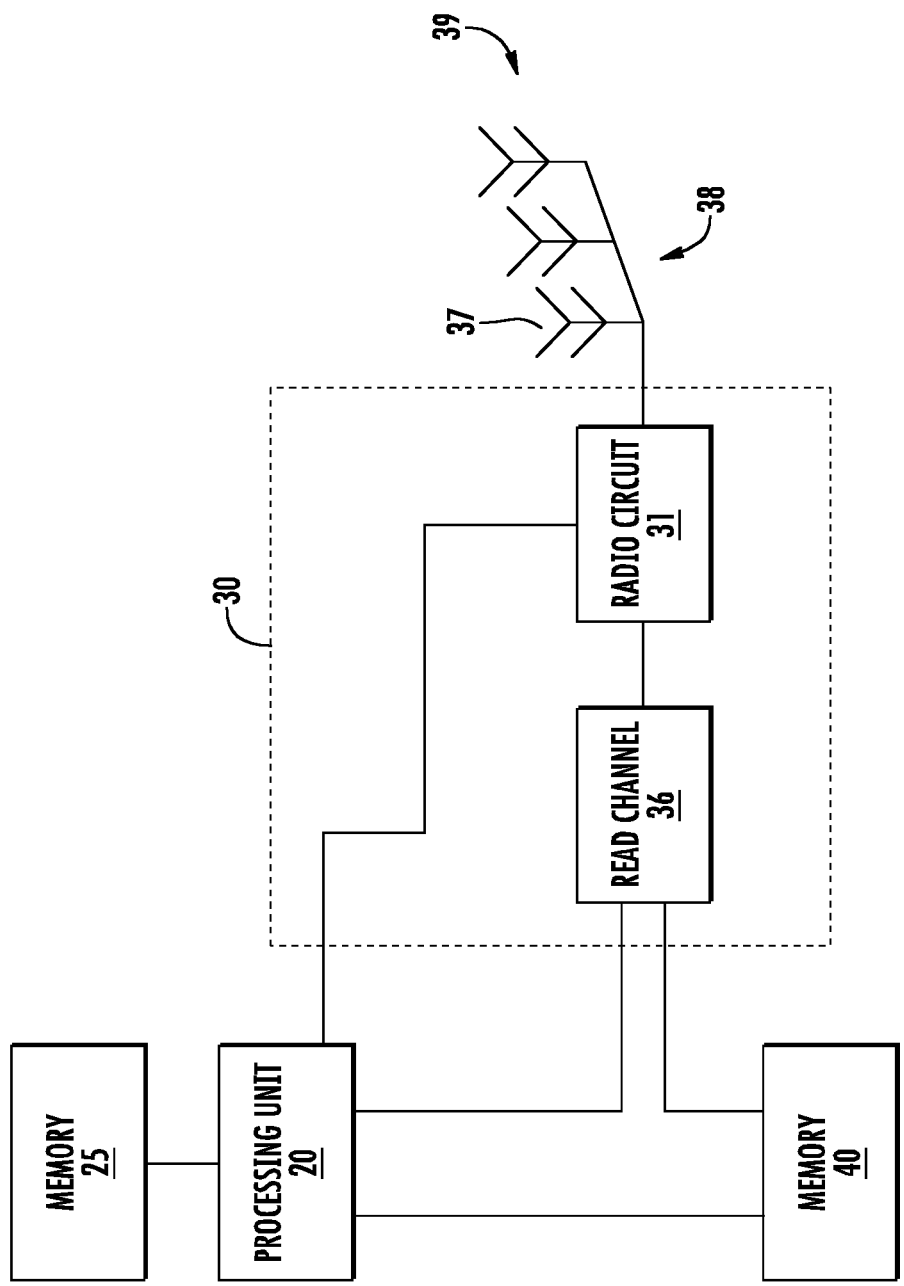
FIG. 1 is a block diagram of a network device that may be used to perform the method described herein.

FIG. 1 shows a network device that may be used to perform the CFO compensation for the AoX algorithm described herein. The network device 10 has a processing unit 20 and an associated memory device 25. The processing unit 20 may be any suitable component, such as a microprocessor, embedded processor, an application specific circuit, a programmable circuit, a microcontroller, or another similar device. The memory device 25 contains the instructions, which, when executed by the processing unit 20, enable the network device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM. The instructions contained within the memory device 25 may be referred to as a software program, which is disposed on a non-transitory storage media.

The network device 10 also includes a network interface 30, which may be a wireless network interface that includes an antenna array 38. The network interface 30 may support any wireless network protocol that supports AoX determination, such as Bluetooth. The network interface 30 is used to allow the network device 10 to communicate with other devices disposed on the network 39.

The network interface 30 include radio circuit 31. This radio circuit 31 is used to process the incoming signal and convert the wireless signals to digital signals. The components within the radio circuit 31 are described in more detail below.

The network interface 30 also includes a read channel 36. The read channel 36 is used to receive, synchronize and decode the digital signals received from the radio circuit 31. Specifically, the read channel 36 has a preamble detector that is used to identify the start of an incoming packet. The read channel 36 also has a sync detector, which is used to identify a particular sequence of bits that are referred to as a sync character.

Additionally, the read channel 36 has a decoder which is used to convert the digital signals into properly aligned bytes of data.

The network device 10 may include a second memory device 40. Data that is received from the network interface 30 or is to be sent via the network interface 30 may also be stored in the second memory device 40. This second memory device 40 is traditionally a volatile memory.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language, which is not limited by this disclosure. Thus, in some embodiments, there may be multiple computer readable non-transitory media that contain the instructions described herein. The first computer readable non-transitory media may be in communication with the processing unit 20, as shown in FIG. 1. The second computer readable non-transitory media may be a CDROM, or a different memory device, which is located remote from the network device 10. The instructions contained on this second computer readable non-transitory media may be downloaded onto the memory device 25 to allow execution of the instructions by the network device 10.

While the processing unit 20, the memory device 25, the network interface 30 and the second memory device 40 are shown in FIG. 1 as separate components, it is understood that some or all of these components may be integrated into a single electronic component. Rather, FIG. 1 is used to illustrate the functionality of the network device 10, not its physical configuration.

Although not shown, the network device 10 also has a power supply, which may be a battery or a connection to a permanent power source, such as a wall outlet.

Figure 2:
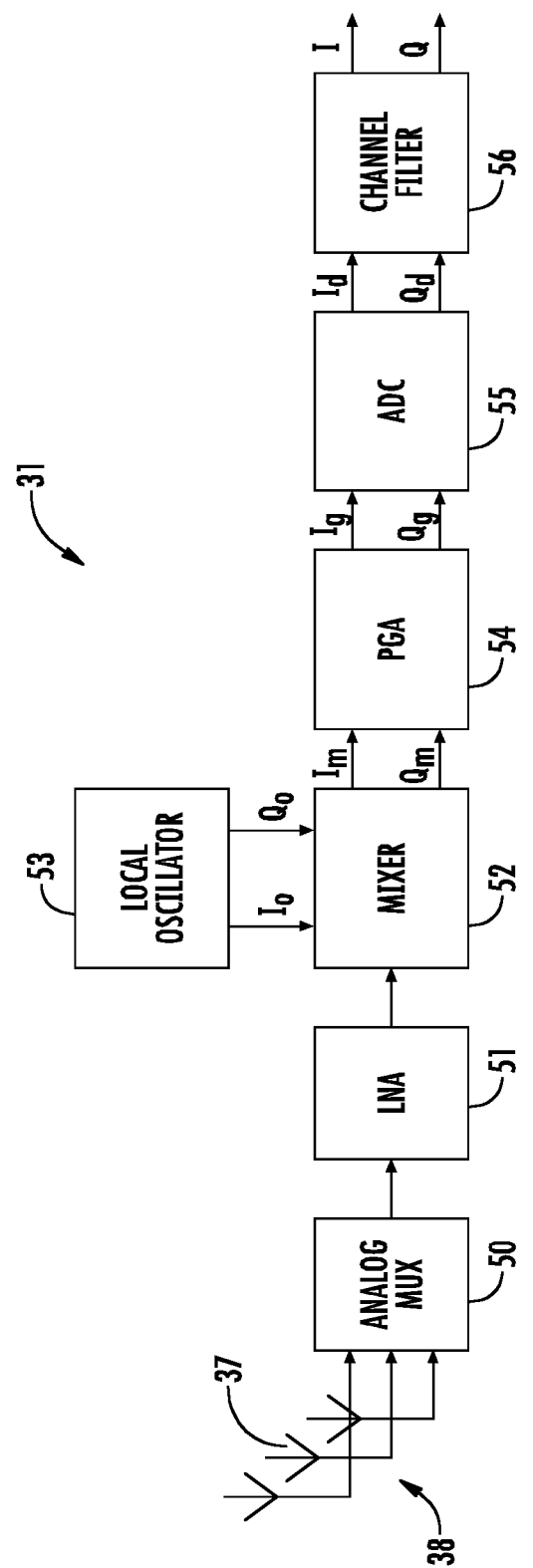
FIG. 2 is a block diagram of the radio receiver of the network device of FIG. 1.

FIG. 2 shows a block diagram of the radio circuit 31. The wireless signals first enter the radio circuit 31 through one antenna element 37 of the antenna array 38. An analog multiplexer 50 may be used to select one antenna element 37 from the antenna array 38. Once selected, this antenna element 37 is in electrical communication with a low noise amplifier (LNA) 51. The LNA 51 receives a very weak signal from the antenna element 37 and amplifies that signal while maintaining the signal-to-noise ratio (SNR) of the incoming signal. The amplified signal is then passed to a mixer 52. The mixer 52 is also in communication with a local oscillator 53, which provides two phases to the mixer 52. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer 52 are then fed into programmable gain amplifier (PGA) 54. The PGA 54 amplifies the $I_m$ and $Q_m$ signals by a programmable amount. These amplified signals are referred to as $I_g$ and $Q_g$. The amplified signals, $I_g$ and $Q_g$, are then fed from the PGA 54 into an analog to digital converter (ADC) 55. The ADC 55 converts these analog signals to digital signals, $I_d$ and $Q_d$. These digital signals may pass through channel filter 56 then exit the radio circuit 31 as I and Q. In certain embodiments, the I and Q values maybe considered complex numbers, wherein the I value is the real component and the Q value is the imaginary component.

The I and Q signals then enter a CORDIC (Coordination Rotation Digital Computer), which determines the amplitude and phase of the signals. Amplitude is given as the square root of $I^2$ and $Q^2$, while phase is given by the $\tan^{-1}(Q/I)$. The CORDIC may be disposed in the radio circuit 31, or elsewhere within the network interface 30.

Figure 3A:
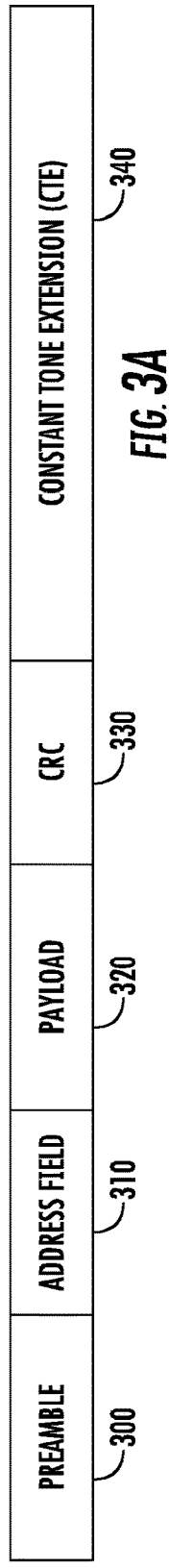
FIG. 3A-3C shows the format of a representative direction detection message transmitted to the system of FIG. 1.
Figure 3B:
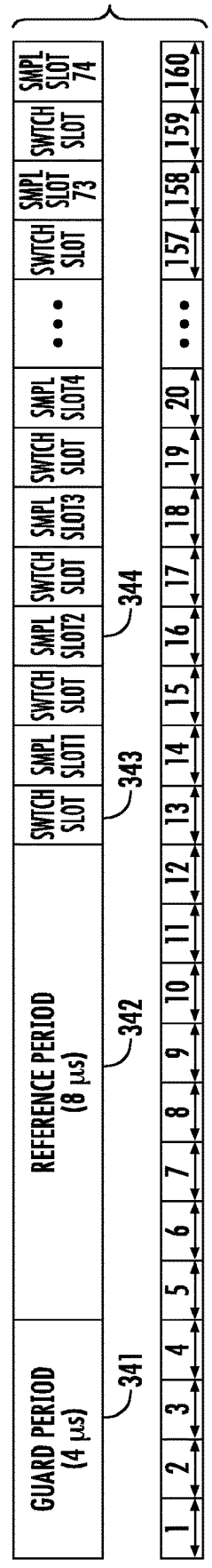
Figure 3C:
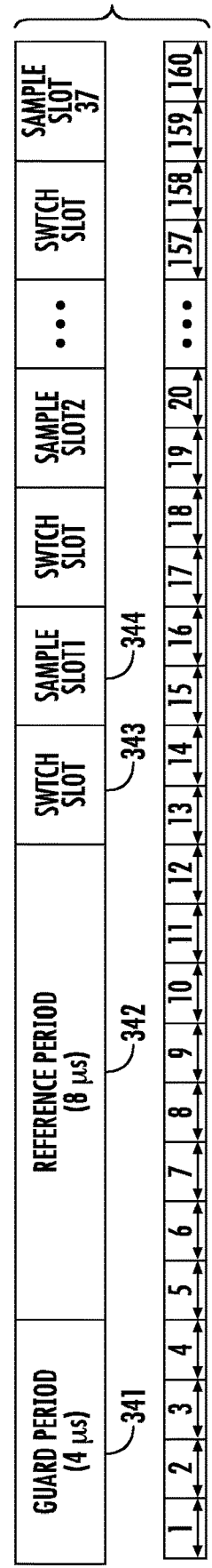

In certain embodiments, the network interface 30 operates on a wireless network that utilizes the Bluetooth network protocol. FIG. 3A shows the format of a special Bluetooth packet that is used for direction detection. These packets typically begin with a preamble 300, an address field 310, a payload 320 and a checksum or CRC 330. However, these special packets also include a constant tone extension (CTE) 340. FIGS. 3B and 3C show two different formats for the CTE 340. In both formats, the CTE 340 includes a guard period 341, a reference period 342, and a plurality of switch slots 343 and sample slots 344. The duration of each switch slot 343 and sample slot 344 may be 1 μsec or 2 μsec, as shown in FIGS. 3B and 3C, respectively. The CTE 340 is a special extension to the Bluetooth packet that transmits a constant frequency, such as a 250 kHz tone. For example, the CTE 340 may be a string of consecutive "1"s. The CTE 340 may be as long as 160 μsec and as short as 16 μsec. In practice, the network device 10 uses a single antenna element 37 of the antenna array 38 to receive the CTE 340 during the guard period 341 and the reference period 342. The network device 10 then switches to another antenna element 37 during each switch slot 343 by changing the selection of the analog multiplexer 50 in the radio circuit 31. The network device 10 samples the tone again with that new antenna element 37 during the sample slot 344. The network device 10 continues switching the antenna element 37 during each switch slot 343 and sampling the tone during the sample slot 344. If there are more switch slots 343 than antenna elements, the network device 10 returns to the first antenna element 37 and repeats the sequence. One set of samples, wherein each antenna element has been used to sample the CTE 340 exactly once may be referred to as a snapshot.

During the entirety of the CTE 340, the sending device is transmitting a tone at a constant known frequency. As stated above, the network device 10 may receive that tone using one antenna element 37 of the antenna array. Specifically, the guard period 341 and the reference period 342, which have a combined duration of 12 μsec, are received using the same antenna element 37.

Figure 4:
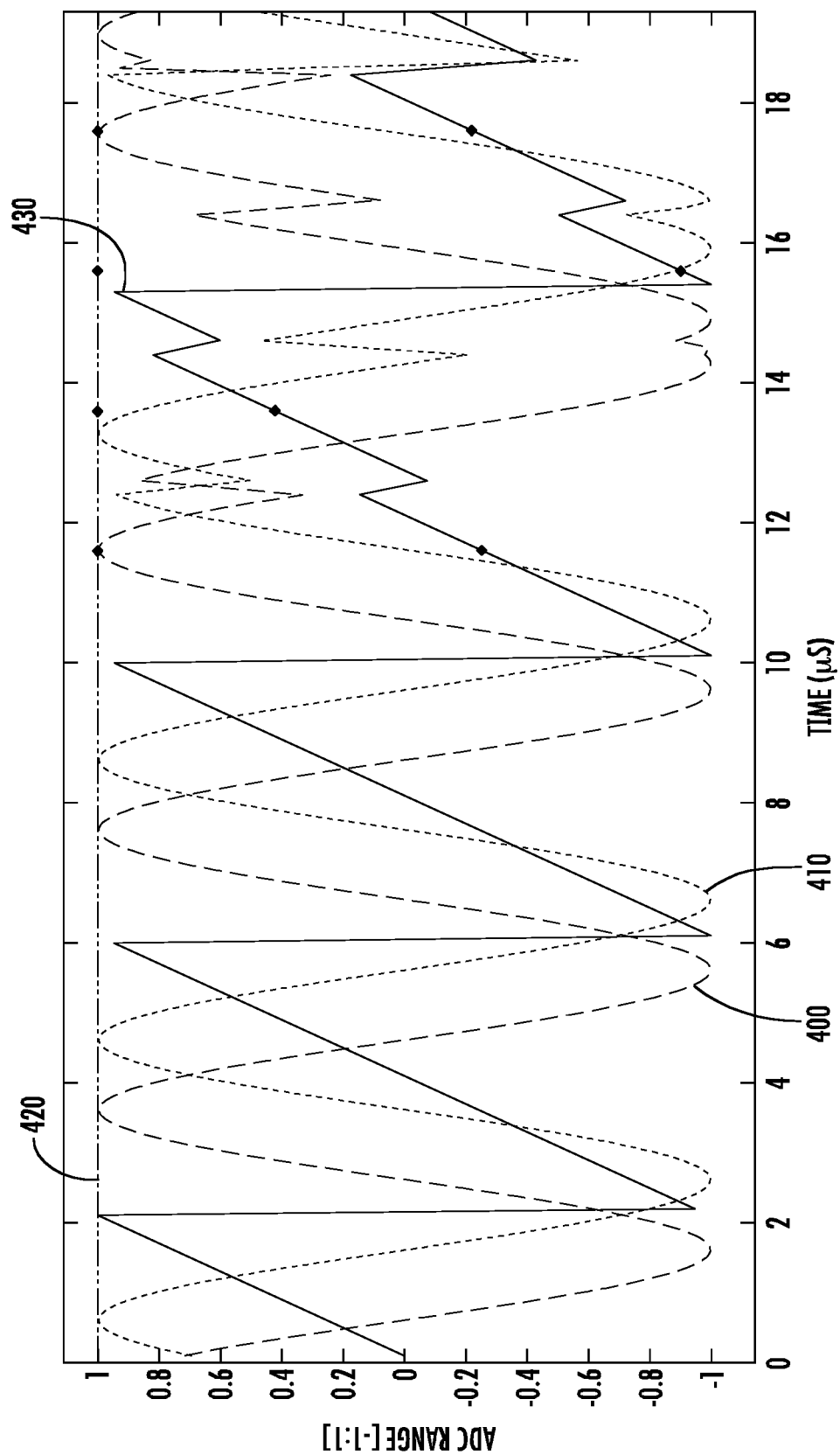
FIG. 4 shows the I, Q, amplitude and phase signals generated during the first part of the CTE.

The network device 10 then performs the steps described above to generate the I and Q signals. In certain embodiments, the processing unit 20 samples the I and Q signals at a very high rate, such as 8 times or more faster than the frequency of the incoming tone. For example, if the incoming tone is 250 kHz, an oversample rate of 4.0 MHz (sixteen times oversampling) or 8.0 MHz (thirty two times oversampling) may be used. The I and Q signals then enter a CORDIC, which determines the amplitude and phase of the signals. Amplitude is given as the square root of $I^2$ and $Q^2$, while phase is given by the $\tan^{-1}$ (Q/I). FIG. 4 shows the I signal 400, the Q signal 410, the amplitude signal 420 and phase signal 430 that are calculated during the guard period 341 and the reference period 342. Note that the phase signal 430 is periodic, with a period of about 4 μsec.

The period of the phase signal 430 is equal to the frequency of the incoming signal. Thus, by determining the period of the phase signal 430, the frequency of the incoming signal can be calculated. This calculated frequency value can then be compared to the known frequency of the incoming signal. For example, the period of the phase signal 430 may indicate that the frequency of the incoming signal is 240 kHz, instead of the known value of 250 kHz. This difference indicates that there is a carrier frequency offset, which will affect the calculations made by the AoX algorithm. Once this carrier frequency offset is determined, it can be compensated for by modifying the I and Q signals before they are used by the AoX algorithm. This modification of the I and Q signals is described in detail below.

Alternatively, rather than determining the period of the phase signal 430, the slope of the phase signal 430 may be used.

For example, it is known that the time derivative of phase is frequency. Thus, the slope of the phase signal 430 also represents the frequency of the incoming signal. Note that the phase signal 430 has discontinuities when the tangent switches from positive to negative. The processing unit 20 only calculates the slope during the continuous regions. The processing unit may determine a discontinuity by detecting a change in the sign of the phase signal 430 and a change in value of roughly pi (π). Alternatively, the change in the phase signal 430 between two points may be performed using complex number arithmetic. In this case, there are no discontinuities. Using these techniques, the frequency of the incoming signal can be calculated. Again, this calculated frequency value can then be compared to the known frequency of the incoming signal. The difference between the calculated frequency value and the known frequency is the carrier frequency offset.

Once this carrier frequency offset is determined, it can be compensated for by modifying the I and Q signals before they are used by the AoX algorithm.

In both of these embodiments, the frequency calculated during at least a portion of the guard period 341 and the reference period 342 may be referred to as the initial frequency, or $F_{init}$.

While the above embodiments utilize the phase signal 430 to computed the actual frequency of the incoming tone, other embodiments are also possible. For example, the received I and Q signals can be multiplied by the expected I and Q signals to determine the carrier frequency offset. Specifically:

Complex(I,Q)=I+jQ;

For a given time, the actual received values are I(t) and Q(t). At that same time, the expected values are:

$I_{expected}(t)=\cos(2*\pi*F_{con}*t)$;

$Q_{expected}(t)=\sin(2*\pi*F_{con}*t)$;

where $F_{con}$ is the expected frequency of the constant tone. Conj(I,Q) can be defined as I−iQ.

For each received set of I and Q values, Complex(I(t),Q(t)) may then be multiplied by Conj($I_{expected}(t)$, $Q_{expected}(t)$).

The result is indicative of the frequency difference between the actual received tone and the expected frequency of the constant tone. For example, a plot may be made graphing the angle formed by the product of these two complex numbers as a function of time. The slope of that plot is indicative of the carrier frequency offset. Once this carrier frequency offset is determined, it can be compensated for by modifying the I and Q signals before they are used by the AoX algorithm.

While the use of the constant tone during the guard period 341 and the reference period 342 allows a determination of the carrier frequency offset, there are other embodiments as well. Specifically, referring to FIG. 3B and FIG. 3C, as described above, there are multiple switch slots 343 and sample slots 344.

Each of these slots can also be used to provide information regarding the frequency of the incoming signal. However, since the antenna element 37 that is being used to receive the incoming signal changes every 2 or 4 μsec (depending on which packet is being utilized), special care must be taken to correctly utilize this additional information.

Figure 5:
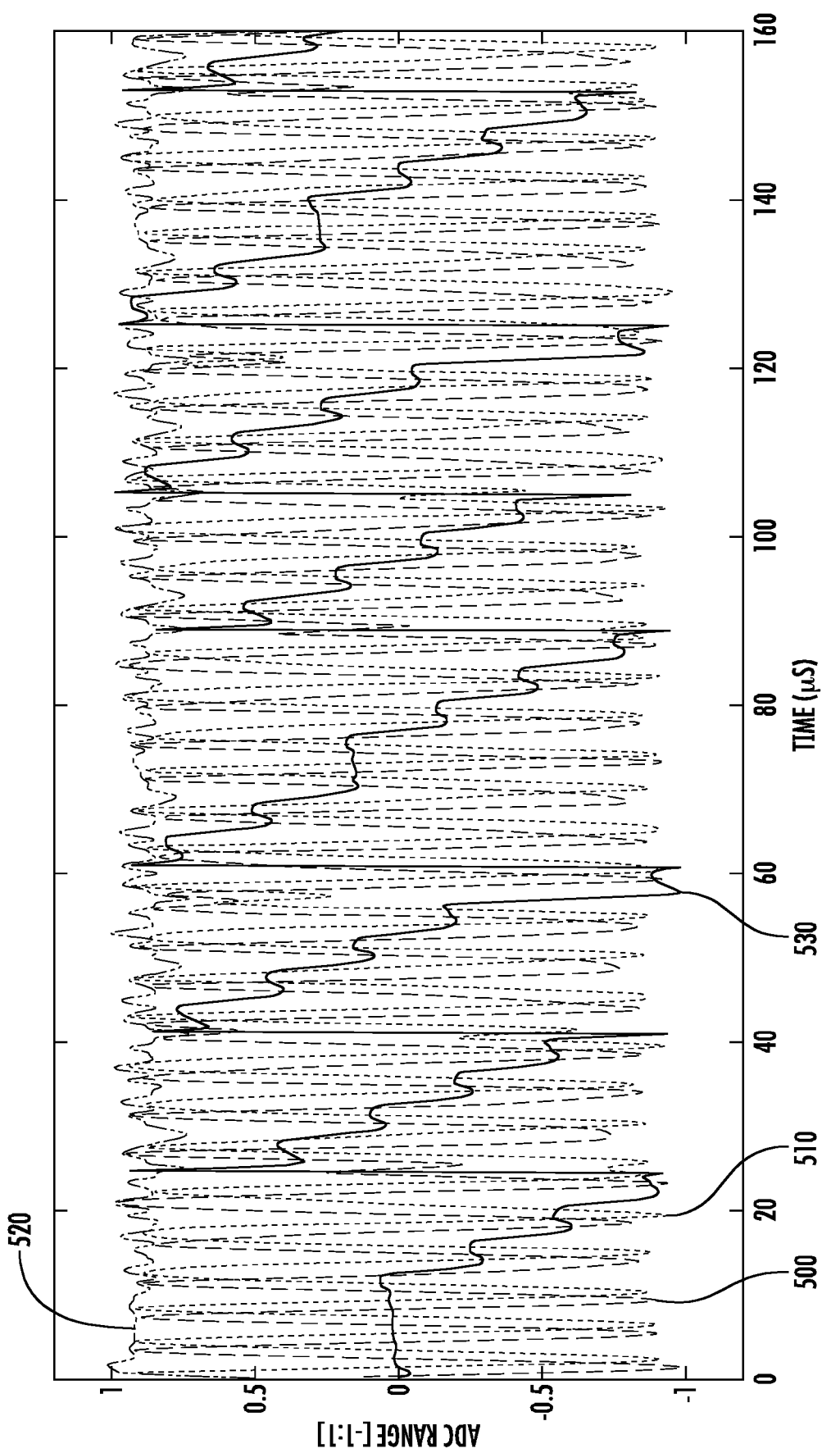
FIG. 5 shows the I, Q, amplitude and phase signals for the entirety of the CTE.
Figure 6:
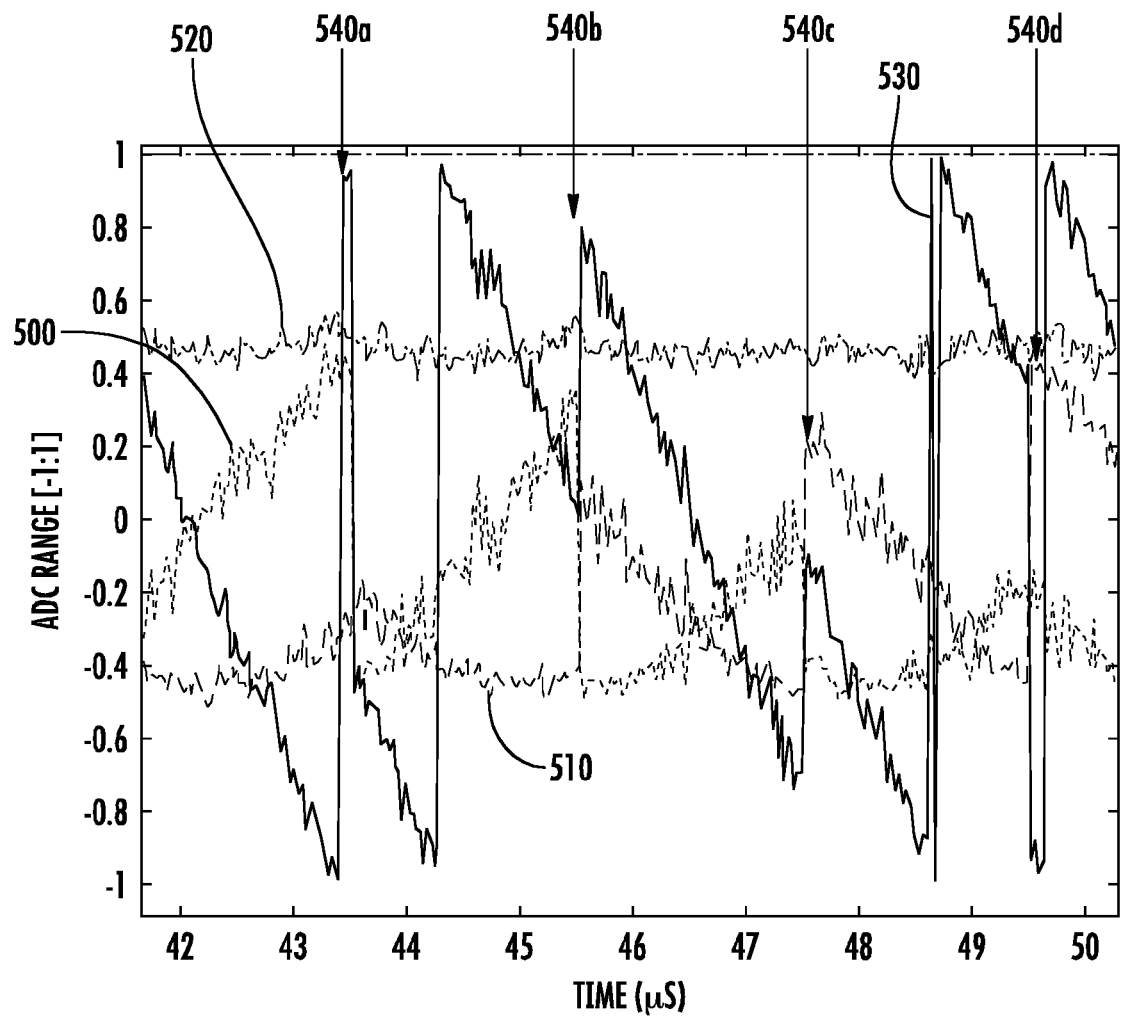
FIG. 6 shows the I, Q, amplitude and phase signals generated during a portion of a different CTE.

For example, FIG. 5 shows the I signal 500, the Q signal 510, the amplitude signal 520 and the phase signal 530 during the entirety of the CTE 340. FIG. 6 shows an expanded view of a portion in the middle of a CTE 340. In FIG. 6, the antenna element 37 is switched every 2 μsec, as denoted by switch points 540a, 540b, 540c and 540d. Note that the amplitude signal 520 is continuous across the switch points, however, the phase signal 530 is not. Thus, the slope of the phase signal 530 may only be studied during the time interval between two adjacent switch points, such as between switch points 540a and 540b.

The location of a switch point 540a-d may be determined in a number of ways. In one embodiment, the processing unit 20 determines the switch point based on when the antenna element 37 was changed. At some point in time, the processing unit 20 switches the antenna element 37. The slope that was calculated using the phase signal obtained immediately before the antenna element 37 is switched is saved as the slope of the previous interval. The processing unit 20 then begin calculating the slope of the phase signal 530 in the new interval.

In other embodiments, the processing unit 20 may determine the switch points based on the fixed time sequence of the CTE 340. In other words, the switch point occurs every 2 μsec (see FIG. 3B) or 4 μsec (see FIG. 3C). Thus, the switch points may be determined based on time, and more particularly, the sequence as defined for the CTE 340.

In other embodiments, the processing unit 20 may determine the location of switch points by comparing two adjacent phase samples. For example, a change in the I signal 500 of more than 10% may be used to determine a switch point. In another embodiment, a change in the Q signal of more than 10% may be used to determine a switch point.

Once the location of the switch points 540*a*-*d* is determined, the slope of the phase signal 530 during the interval between two adjacent switch points can be calculated. In one embodiment, the value of the first phase signal in the interval and the value of the last phase signal in the interval are used to calculate an average slope. In another embodiment, the slope of every two consecutive phase signals is calculated and saved. The sum of all of these slopes is then determined by the number of points in that interval minus 1 (i.e. N−1). In both embodiments, this slope represents the average frequency of the tone during that interval. Thus, according to one embodiment, for each sample slot, i, there is an associated frequency (F(i)).

Thus, in this embodiment, there are i+1 frequencies that are computed: $F_{init}$ and a plurality of F(i), where i is equal to the number of the sample slot associated with this frequency.

In another embodiment, a running average of the slope is created. For example, the processing unit 20 compares two adjacent phase signals 530 and calculates the slope. This value is saved and a counter is incremented. At some point in time, the processing unit 20 switches the antenna element 37. The slope that was calculated using the phase signal obtained immediately after the antenna element 37 is switched is discarded and the counter is not incremented. At the end of the packet, the total sum of all slopes is divided by the number of calculations performed. In this embodiment, a single frequency is calculated. This frequency would then be applied to all of the I and Q values.

Figure 7:
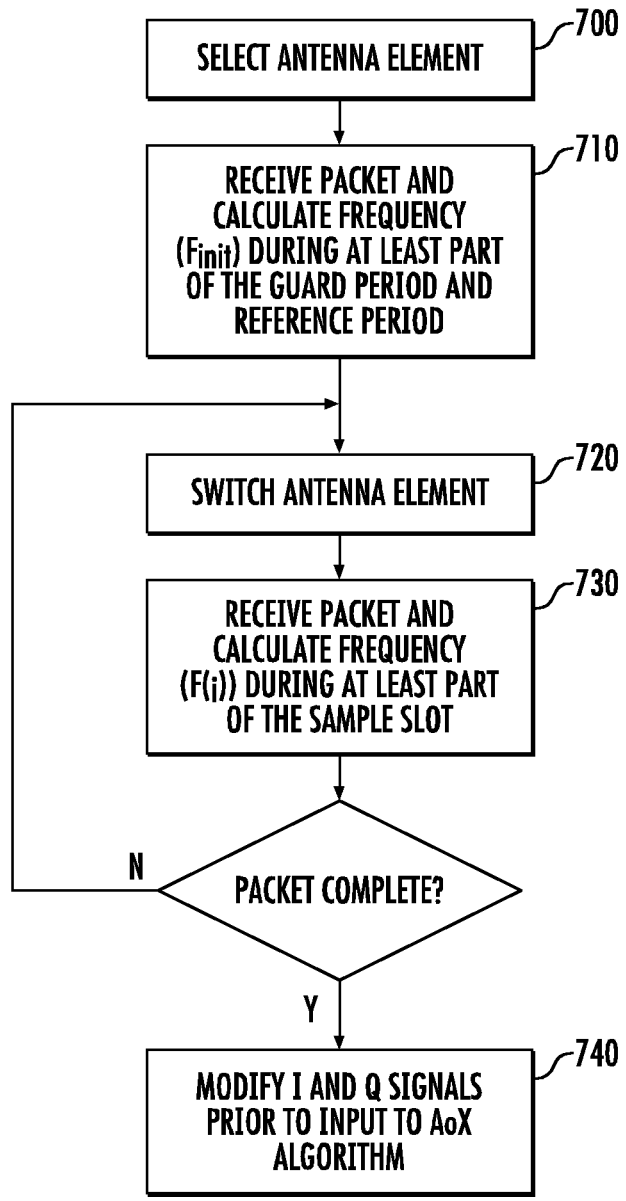
FIG. 7 is a flowchart showing the operation of the network device according to one embodiment.

A flow chart showing the steps associated with determining these frequencies associated with an incoming signal and compensating for the carrier frequency offset is shown in FIG. 7. This may be referred to as a carrier frequency offset (CFO) compensation technique.

First, as described above and shown in Box 700, the processing unit 20 selects one of the antenna elements 37. The network device 10 then begins receiving the incoming signal, which may be a packet that includes a CTE 340, as shown in FIG. 3A. During at least a portion of the guard period 341 and the reference period 342, the processing unit 20 calculates the frequency of the incoming signal, as shown in Box 710. This may be achieved by either measuring the period of the phase signal 430 or by calculating the slope of the phase signal 430. In both embodiments, the frequency of the incoming signal during the guard period 341 and the reference period 342 is calculated using the phase signal 430. Note that the processing unit 20 may calculate the frequency using either the entirety of the guard period 341 and the reference period 342, or only a portion of these periods. This calculated frequency is referred to as $F_{init}$.

In certain embodiments, the processing unit 20 does not calculate the frequency during any of the sample slots 344 and proceeds directly to Box 740. However, in other embodiments, the processing unit 20 collects additional information by also calculating the average frequency during each sample slot 344.

In this embodiment, the processing unit 20 switches the antenna element 37, as shown in Box 720. The processing unit 20 then calculates the slope of the phase signal 530, as shown in Box 730. The processing unit 20 continues calculating the slope until the next switch point occurs. At this time, the processing unit 20 may save the average frequency calculated for this interval. As described above, this frequency may be referred to as F(i), where i is the number of the sample slot associated with this frequency. If the entirety of the packet has not been received, the processing unit 20 repeats Boxes 720-730.

Based on the frequency values that were calculated in Boxes 710 and 730, the I and Q signals are modified prior to being used by the AoX algorithm, as shown in Box 740.

While the above algorithm is being executed during the reception of the CTE 340, other activities are also occurring. For example, the processing unit 20 also samples the incoming signal during each sample slot. In the case of the CTE 340 of FIG. 3B, the processing unit samples the I and Q values every 2 μsec. In the case of the CTE 340 of FIG. 3C, the processing unit samples the I and Q values every 4 μsec. In certain embodiments, the processing unit 20 may also sample the guard period 341 and the reference period 342. Each set of sampled values may be referred to as I(i) and Q(i), where i is the number of the sample slot where the I and Q signals were sampled. Collectively, these values are referred to as the sampled I and Q signals.

Thus, at the completion of the packet, the processing unit has collected the following information; $F_{init}$, optionally a plurality of F(i), and the sampled I and Q signals (I(i) and Q(i)) for all values of i.

This information may be used in a variety of ways. For example, in one embodiment, it may be assumed that the carrier frequency offset is constant. In other words, the frequency of the carrier does not vary as a function of time. In this embodiment, the calculated frequency values may simply be averaged, as shown below:

$$F_{average} = \frac{\left(F_{init} + \sum_{i=1}^{N} F(i)\right)}{N+1}$$

In embodiments where the frequency is calculated only during the guard period 341 and the reference period 342, the average is simply $F_{init}$.

This average frequency can then be used to modify each I and Q value. In other words, the computed frequency ($F_c(i)$) in each sample slot is the same.

Thus, the carrier frequency offset of a given sample slot, i, referred to as CFO(i), is defined as $F_c(i) - F_{known}$, where $F_{known}$ is the expected frequency of the incoming constant tone.

In other embodiments, it may be possible that, in addition to a fixed offset, there may also be frequency drift. Frequency drift is a phenomenon where the carrier frequency drifts over time. This may be due to temperature, rapid power consumption changes at the sending or receiving device or other causes. The Bluetooth specification allows up to 400 Hz of frequency drift every microsecond. However, unlike CFO, the frequency drift is not constant.

Figure 8:
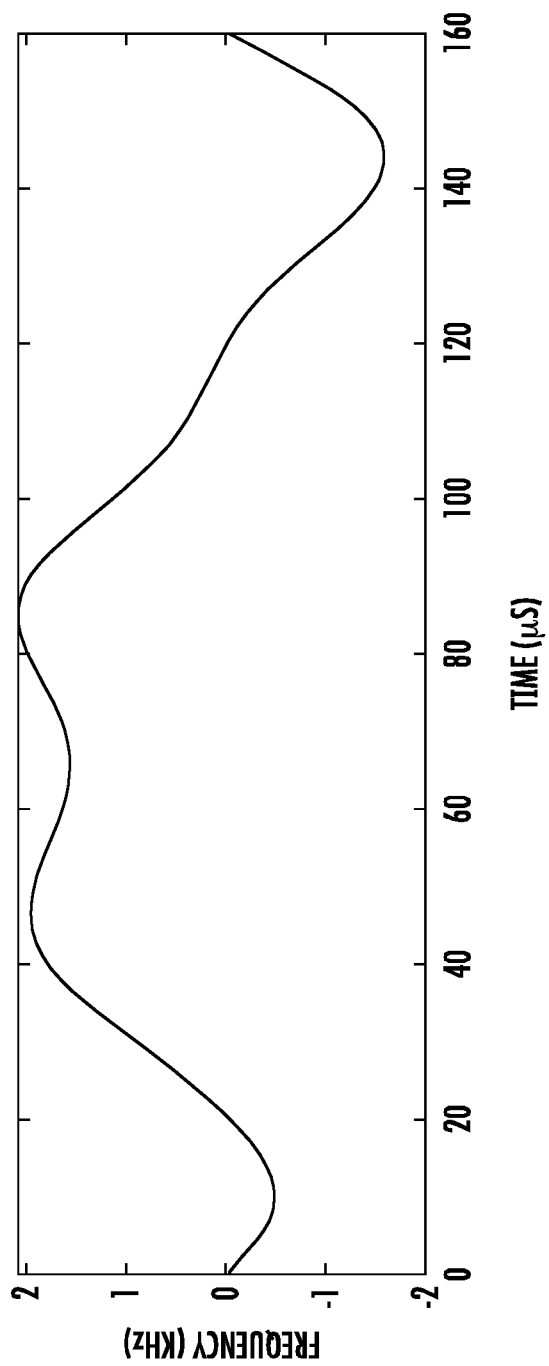
FIG. 8 shows frequency drift during a packet.

FIG. 8 shows a timing diagram showing frequency drift. Note that the frequency varies over the course of the CTE 340. In this embodiment, an average frequency, such as that shown above, may not accurately capture the actual frequency of the carrier frequency during each sample slot. Therefore, in one embodiment, the I and Q values for each sample slot are modified differently. For example, in one embodiment, it may be assumed that F(i) is the frequency during sample slot i. In this embodiment, I(i) and Q(i) are modified using only F(i). In other words, CFO(i)=$F_c$(i)−$F_{known}$=F(i)−$F_{known}$.

In another embodiment, the computed frequency used for each sample slot may be a weighted average of the frequencies of the adjacent sample slots. For example, in one embodiment, the computed frequency used to compensate I(i) and Q(i) may include the frequency for the previous sample slot and the present sample slot, such as $$F_c(i) = \frac{F(i-1) + F(i)}{2}.$$

In another embodiment, the frequency used for each sample slot may also include the calculated frequency for the next sample slot, such as $$F_c(i) = \frac{F(i-1) + F(i) + F(i+1)}{3}$$

or a weighted average, such as $$F_c(i) = \frac{F(i-1) + 2F(i) + F(i+1)}{4}.$$

Of course, other weighted averages may also be used. For example, in one embodiment, the average frequency for the entire CTE 340 is used as part of a weighted average that includes the frequency calculated for a particular sample slot. In this way, the carrier frequency offset is compensated for by using the $F_{average}$, and the frequency drift is compensated for by using the F(i) value for that sample slot. Thus, in all of these examples, CFO(i)=$F_c$(i)−$F_{known}$.

The disclosure above describes the many ways in which the calculated frequency values may be combined to compensate for carrier frequency offset and drift. The compensation can be applied to the respective I and Q values. In one embodiment, the compensated values for I and Q may be calculated as shown below:

$$I_{compensated}(i) + jQ_{compensated}(i) = (I(i) + jQ(i)) * e^{-j2\pi * F_c(i) * T_s i};$$

where j is $\sqrt{-1}$, $F_c$(i) is the computed frequency for sample slot i, $T_s$ is the sample time (either 2 μsec or 4 μsec) and i is the number of the sample slot.

Alternatively, the I and Q samples may be compensated for using the following equation:

$$I_{compensated}(i) + jQ_{compensated}(i) = (I(i) + jQ(i)) * e^{-j2\pi * CFO(i) * T_s i};$$

wherein CFO(i) is the carrier frequency offset for sample slot i.

Thus, the I and Q values can be compensated for using either the actual computed frequency or the carrier frequency offset. Note that in certain embodiments described above, the computed frequency is calculated directly from the phase or from the I and Q values. In these embodiments, the carrier frequency offset can be then obtained from the computed frequency. In other embodiments, the carrier frequency offset is computed directly from the I and Q signals. In these embodiments, the computed frequency can be determined from the carrier frequency offset. Thus, in all embodiments, a value representative of the frequency of the incoming signal is computed and this value is used to compensate for the I and Q values.

Thus, in certain embodiments, all of the sampled I and Q values are stored in memory device 25 by processing unit 20 as the packet is being received. After the packet has been received and all of the computed frequencies are calculated, the processing unit then compensates for these stored I and Q values as described above and shown in Box 740 in FIG. 7. These compensated I and Q values are then used by the AoX algorithm to calculate the angle of arrival or angle of departure.

As described above, the I and Q signals are used by an AoX algorithm. Many different AoX algorithms may be used. For example, the multiple signal classification (MUSIC) algorithm utilizes phase information to determine the direction of arrival. The MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph. To more clearly define these points, the MUSIC algorithm actually plots the reciprocal of these calculated values, so that the minimum value of the calculated values creates a narrow peak. Thus, the minimum value of any point in the pseudo-spectrum is 0, and there is no maximum value. Stated differently, a peak in the pseudo-spectrum corresponds to the angle of some signal entering the antenna array 38.

In addition to the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used. In each of these, the algorithms use different mathematical formulas to calculate the angle of arrival, but the modifications to the I and Q signals are equally applicable to these algorithms.

Tests have shown that the accuracy of the AoX algorithm can improve by roughly a factor of two by using this carrier frequency offset compensation technique. For example, in one test, the AoX algorithm was inaccurate by about 8 degrees. By using the CFO compensation technique, that error was reduced to about 4 degrees.

In certain embodiments, the method described above can be further refined. As shown in FIGS. 3B and 3C, there are a plurality of switch slots 343 and sample slots 344. The number of sample slots 344 may exceed the number of antenna elements 37. For example, there may be 37 or 74 sample slots, but only 16 antenna elements. In this case, the first antenna element is used for sample slots 1, 17, 33, etc. In other words, the same antenna element may be used to receive two or more sample slots 344.

Figure 9:
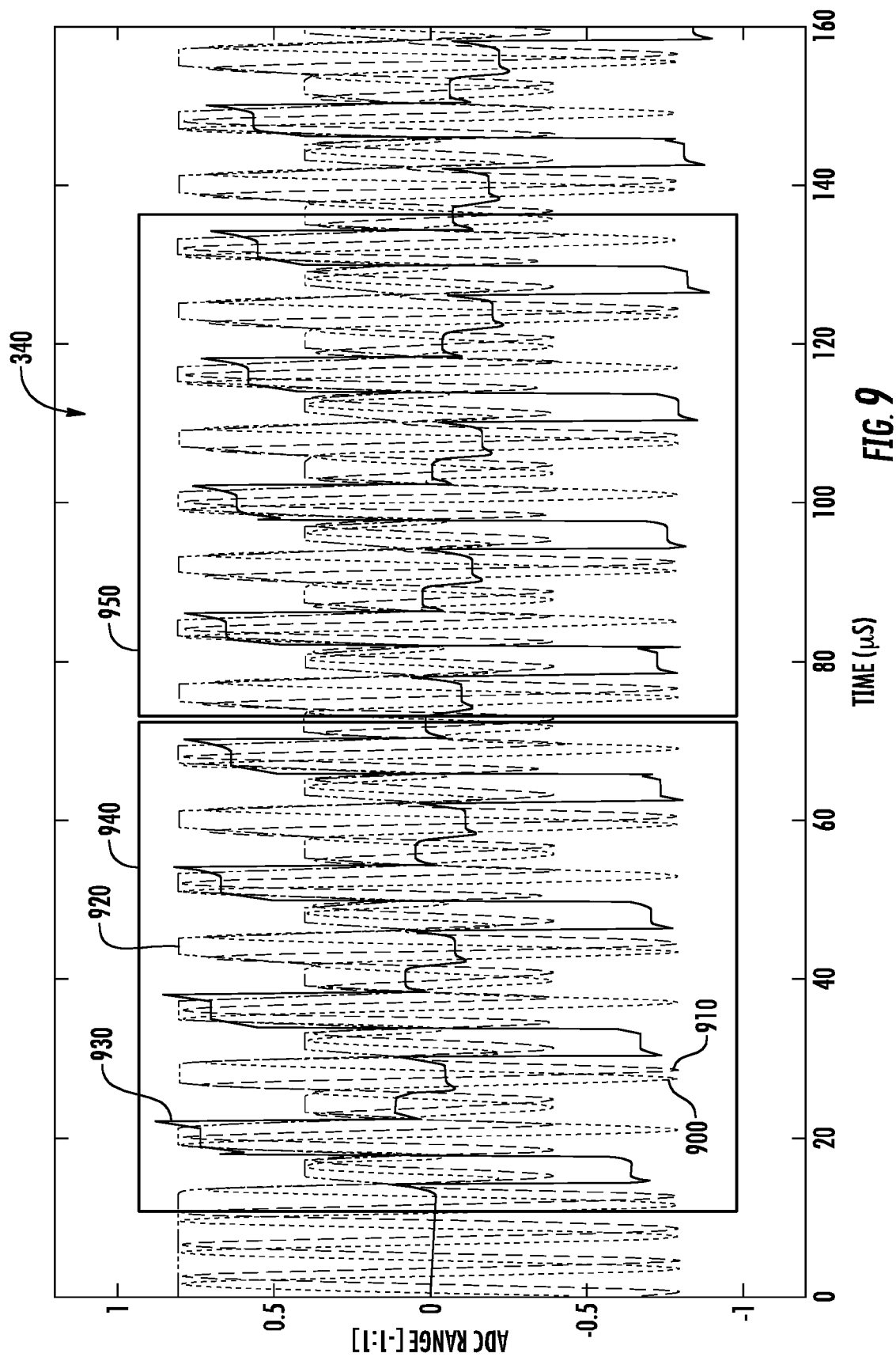
FIG. 9 shows the I, Q, amplitude and phase signals generated according to another embodiment.

This fact may be used to further refine the calculation of the carrier frequency offset. FIG. 9 shows a CTE 340 where there are more sample slots 344 than antenna elements. This figure shows the I signal 900, the Q signal 910, the amplitude signal 920 and the phase signal 930 during the entirety of the CTE 340. The first snapshot 940 represents the portion of the CTE 340 where each antenna element of the network device 10 has been selected exactly one time. The second snapshot 950 shows the second such portion of the CTE 340. Although only two snapshots are shown, there may be more or fewer snapshots, depending on the configuration of the antenna array 38 in the network device 10 and the number of sample slots 344.

The time between the start of the first snapshot 940 and second snapshot 950 is defined as the number of different antenna elements in network device 10 multiplied by 2 µsec (for the packet shown in FIG. 3B) or 4 µsec (for the packet shown in FIG. 3C).

If there is no carrier frequency offset, the phase that is sampled by a particular antenna element during the first snapshot 940 would be exactly the same as the phase that is sampled by that antenna element during the second snapshot 950.

However, if there is a carrier frequency offset, there will be a phase difference between the sample taken by a particular antenna element during the first snapshot 940 and the second snapshot 950. If this phase difference is divided by the duration of the first snapshot 940, the difference in frequency can be calculated.

Specifically, the carrier frequency offset (CFO(i)) can be defined as:

$$CFO(i) = \frac{\text{Phase}(i) - \text{Phase}(i+N)}{\text{Duration of Snapshot 940}},$$

where N is the number of antenna elements.

This calculation can be repeated for all N antenna elements. Furthermore, if there are more than two snapshots, the calculation may be performed for the second and third snapshots, the third and fourth snapshots, etc. This will result in a plurality of CFO(i) values. All of the CFO(i) values can be averaged and this average value may be used to compensate for all of the I and Q values, as explained above.

In certain embodiments, this technique is used to augment the calculations of $F_{init}$ that was made during the guard period 341 and the reference period 342.

For example, in certain embodiments, an initial frequency ($F_{init}$) calculation was performed using the techniques described above and shown in Box 710 in FIG. 7. This initial frequency was then used to compute the carrier frequency offset, which is then used to compensate for the I and Q values, as shown in Box 740 in FIG. 7. These compensated I and Q values are now used as the input to this new refinement technique.

Figure 10:
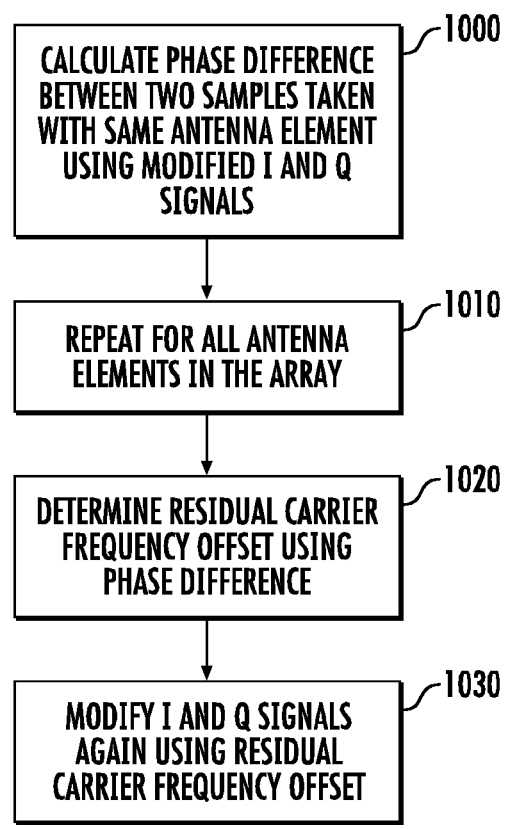
FIG. 10 is a flowchart showing the operation of the network device in another embodiment.

A flowchart of this refinement process is shown in FIG. 10.

These modified I and Q values are now used for the refinement procedure. The phase difference between a sample taken by a particular antenna element during the first snapshot 940 and a sample taken by the same antenna element during a second snapshot 950 is then calculated, as shown in Box 1000. This phase difference is performed using the I and Q signals that were modified in Box 740. Optionally, this computation is repeated for each antenna element in the antenna array, as shown in Box 1010. In other words, this step will result in a plurality of phase differences, if the calculation is repeated for each antenna element in the antenna array. These phase differences may then be averaged to compute an average phase difference. If this average phase difference is then divided by the time duration of a snapshot, the result is the residual carrier frequency offset, as shown in Box 1020. This residual carrier frequency offset can then be used to modify the previously modified I and Q values, as shown in Box 1030. The equation used to modify the I and Q signals is as defined above. These twice modified I and Q values can then be used as inputs to an AoX algorithm.

Of course, if desired, this process may be repeated again using the twice modified I and Q values.

In other embodiments, this refinement technique utilized the originally sampled I and Q values to find the carrier frequency offset.

The polarization of the incoming signal may affect the accuracy of the AoX algorithm. For example, a horizontally polarized signal received by a vertically polarized antenna element may have a very low signal to noise ratio (SNR). Thus, if the reference period 342 is received on an antenna element with the wrong polarization, the signal level and the SNR will be low. Consequently, the carrier frequency offset calculations made during the reference period 342 may be inaccurate and result in incorrect AoX results.

However, a dual polarized antenna may be used to address this problem. A dual-polarized antenna array consists of a plurality of dual-polarized antenna elements. The design of each antenna element is implementation specific, but as an illustration, assume the dual-polarized antenna comprises two half-dipole antennas on the same plane and laid out at 90° with respect to each other. The signal from each half-dipole antenna may be measured independently. When an incoming signal hits these two half-dipole antennas, the resulting outputs will be 90° apart in phase. This is true even if the antenna elements aren't built with half-dipoles as described above, assuming that they are orthogonal from a polarization standpoint.

This relationship may be used to determine the carrier frequency of the incoming signal. Specifically, as the CTE 340 is being received, the processing unit 20 selects a different antenna element 37 each switch slot 343. In the case of an array of dual polarized antenna elements, the processing unit 20 selects one polarization of the first antenna element during the first switch slot 343, and selects the other polarization of the first antenna element during the second switch slot 343. During the third switch slot 343, the processing unit 20 selects one polarization of the second antenna element.

When the system transitions from one polarization of the first antenna element to the other polarization of the first antenna element, the phase of the incoming I and Q signals should switch by exactly 90°. This fact can be used to find the carrier frequency offset.

Figure 11:
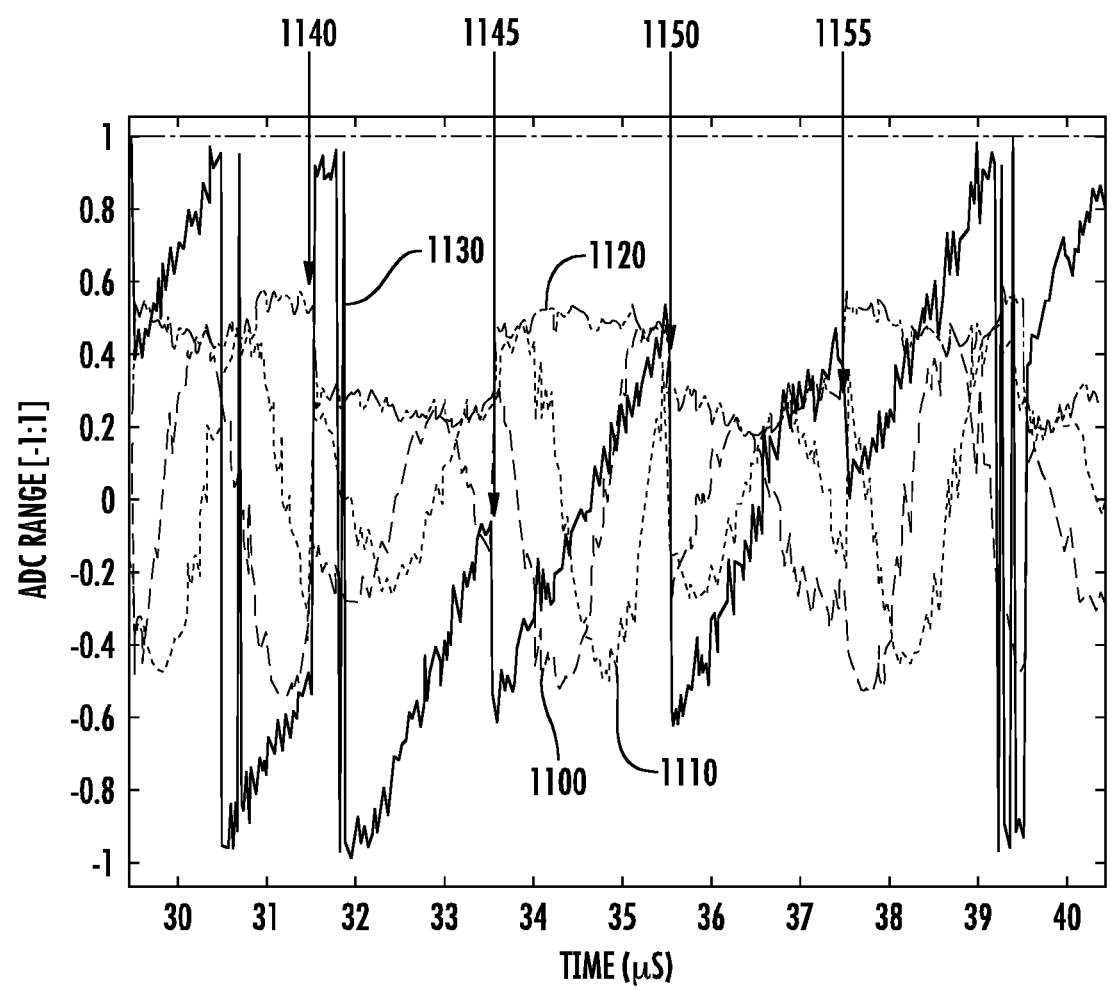
FIG. 11 shows the I, Q, amplitude and phase signals generated during a portion of a different CTE using an array of dual polarized antennas.

FIG. 11 shows a portion of the middle of a CTE 340. FIG. 11 shows the I signal 1100, the Q signal 1110, the amplitude signal 1120 and the phase signal 1130. At switch point 1140, the processing unit 20 selected a new dual polarized antenna element. At switch point 1145, the processing unit 20 selects the other polarization of that dual polarized antenna element. Thus, at switch point 1145, there should be exactly a 90° change in the phase signal 1130. In other words, the phase signal measured immediately before switch point 1145 and the phase signal measured immediately after switch point 1145 should be 90° apart.

At switch point 1150, the processing unit 20 selects a second dual polarized antenna element. The phase relationship between the first dual polarized antenna element and the second dual polarized antenna element is unknown. Therefore, no additional information can be obtained at this switch point 1150. However, at switch point 1155, the processing unit 20 selects the other polarization of that second dual polarized antenna element. Thus, at switch point 1155, there should be exactly a 90° change in the phase signal 1130. In other words, the phase signal measured immediately before switch point 1155 and the phase signal measured immediately after switch point 1155 should be 90° apart. If this difference is not exactly 90°, then there is a phase error, which implies that there is a carrier frequency offset. The carrier frequency offset (CFO) of the incoming signal can be computed as:

$$CFO = \frac{\text{(Phase at first polarization} - \text{(Phase at second polarization} + 90°))}{\text{sample time between first polarization and second polarization}}$$

In other words, if there was no carrier frequency offset, the two phases would be exactly 90° apart. Any deviation in this represents a phase error, where the phase error is defined as the difference between the two phases, less 90°. If that phase error is divided by the time between the two samples, the frequency offset can be found. This calculated carrier frequency offset can then be used to compensate for the I and Q values, as described above.

Thus, even with low SNR, it is possible to determine the carrier frequency offset using dual polarized antenna elements and to compensate for this CFO. In certain embodiments, if the SNR is particularly low for a certain element of the pair, the calculation may be excluded for that pair.

In certain embodiments, this technique is used to refine the calculation of the initial carrier frequency offset. For example, the sequence shown in Boxes 700-740 of FIG. 10 may be performed. At this conclusion of this sequence, a set of modified I and Q values are created. These modified I and Q values are then used as inputs to this refinement process which utilizes a dual polarized antenna element.

Figure 12:
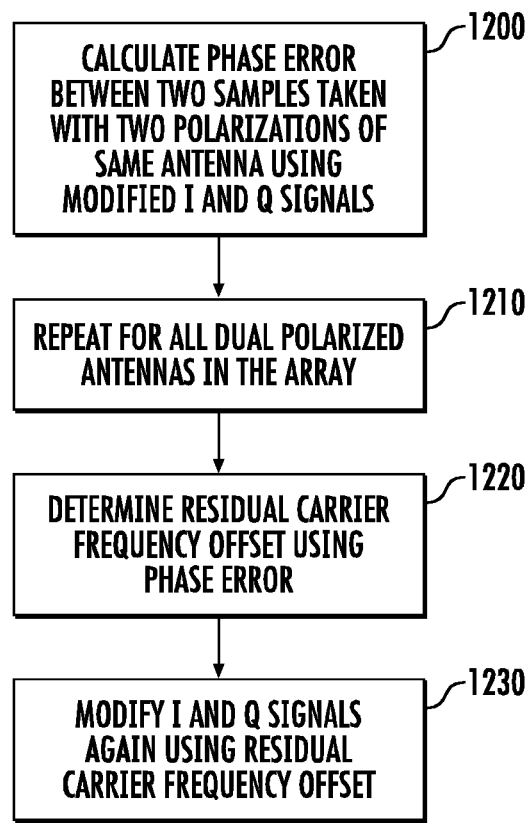
FIG. 12 is a flowchart showing the operation of the network device in another embodiment.

This refinement process is shown in FIG. 12. As shown in Box 1200, the phase error between the modified I and Q values for two samples that were taken with different polarizations of the same antenna element is computed. As described above, the phase error is defined as the difference between the phases of the two samples, less 90°. This calculation may be repeated for all dual polarized antennas in the array as shown in Box 1210. All of these phase errors may be averaged to determine an average phase error. This average phase error is then used to calculate the residual carrier frequency offset, as shown in Box 1220. The stored I and Q values are then modified again using the residual carrier frequency offset. The equation used to modify the I and Q signals is as defined above. These twice modified I and Q values can then be used as inputs to an AoX algorithm.

Of course, if desired, this process may be repeated again using the twice modified I and Q values.

In other embodiments, this refinement technique utilized the originally sampled I and Q values to find the carrier frequency offset.

While the description of FIGS. 11 and 12 describe dual polarized antenna elements, other embodiments are also possible. For example, the issue of cross-polarization describes above can be addressed to some degree through the use of circularly polarized antenna elements. Circularly polarized antennas can receive both horizontal and vertical polarizations equally well, but in general the SNR may be lower as compared to having linearly polarized antenna elements and matching polarizations between the receiving and transmitting antennas (e.g. vertical polarization on both ends), or having dual-polarized antennas. The algorithms described herein with respect to FIGS. 4-10 can work equally well for circularly polarized antenna elements.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with Bluetooth. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

Similar functions can be performed using an angle of departure algorithm. For example, the user may have a device that has a single antenna, rather than an antenna array. If the beacons, such as those described above in the shopping mall or warehouse, utilize an antenna array, the user's device may determine the angle of departure.

The device may also be able to determine the angle of departure from multiple beacons. If the position of the beacons is known, the device may be able to calculate its spatial position from these angles of departure.

In other words, this information can be used in the same manner as angle of arrival information for wayfinding and spatial positioning. Furthermore, the device may have an indicator to provide an indication of the angle of departure to the user. In other embodiments, the device may have an indicator to inform the user of its spatial position.

The present system and method has many advantages. For example, it is common for the frequency of wireless devices to vary from the ideal value. This variance causes the AoX algorithms to misinterpret the incoming tone, reducing the accuracy of the final result. By being able to determine the carrier frequency offset, this offset can be corrected for in the I and Q samples before they are input to the AoX algorithm. Thus, accuracy is improved. Further, these techniques can be readily added to existing wireless devices, as the method for determining and compensating for carrier frequency offset does not require any modifications to the existing AoX algorithm, since it is the input to the AoX algorithm that is modified.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A device to calculate an angle of arrival or an angle of departure, comprising:
    a wireless network interface, wherein the wireless network interface receives an incoming signal and generates an I signal and a Q signal;
    a processing unit;
    a memory device, comprising instructions, which when executed by the processing unit, enable the device to:
        receive a packet that includes a constant tone extension (CTE), wherein the CTE comprises a tone having a known frequency and wherein the CTE comprises a guard period, a reference period, a plurality of switch slots and a plurality of sample slots;
        sample the CTE a plurality of times during at least a portion of the guard period and the reference period and compute the phase of each sample, using a sample rate that is at least 8 times the known frequency;
        calculate a phase of each sample, wherein the phase is defined as arctan(I/Q), and compile the plurality of the phases to form a phase signal;
        compute an initial frequency ($F_{init}$) of the tone based on the phase signal;
        use $F_{init}$ to determine a calculated frequency for each sample slot of the CTE;
        store a plurality of I and Q signals, where one I signal and one Q signal is stored during each sample slot; and
        compensate for a difference between the known frequency and the calculated frequency by modifying the plurality of stored I and Q signals using the calculated frequency to create a plurality of compensated I and Q signals; and
        using the plurality of compensated I and Q signals as inputs to an AoX algorithm.
2. The device of claim 1, wherein the memory device further comprises instructions, which when executed by the processing unit, enable the device to:
    sample the CTE during each sample slot, wherein the sample rate is at least 8 times the known frequency;
    calculate a phase of each sample, wherein the phase is defined as arctan(I/Q), and compile the plurality of the phases into the phase signal;
    compute a frequency of the tone during each sample slot of i slots, based on the phase signal, wherein the frequency of the tone during an ith sample slot is referred to as F(i);
    and wherein a determination of the calculated frequency for the ith sample slot is made using F(i).
3. The device of claim 2, wherein the determination of the calculated frequency for ith sample slot is made using a weighted average of calculated frequencies of two or more sample slots.
4. The device of claim 3, wherein the determination of the calculated frequency for ith sample slot is made using F(i−1).
5. The device of claim 2, further comprising an antenna array comprising a plurality of antenna elements and wherein the memory device further comprises instruction that enable the device to:
    select a different antenna element during each switch slot.
6. The device of claim 1, wherein the initial frequency is calculated by determining a slope of the phase signal.
7. The device of claim 1, wherein the initial frequency is calculated by determining a period of the phase signal.
8. A device to calculate an angle of arrival or an angle of departure, comprising:
    a wireless network interface, comprising a dual polarized antenna wherein the wireless network interface receives an incoming signal and generates an I signal and a Q signal;
    a processing unit;
    a memory device, comprising instructions, which when executed by the processing unit, enable the device to:
        receive a packet that includes a constant tone extension (CTE), wherein the CTE comprises a tone having a known frequency and wherein the CTE comprises a guard period, a reference period, a plurality of switch slots and a plurality of sample slots;
        sample the CTE during each sample slot to obtain a plurality of sampled I and Q signals, wherein a first sample is collected using a first polarization of the dual polarized antenna and a second sample is collected using a second polarization of the dual polarized antenna;
        calculate a phase of the first sample and the second sample, wherein the phase is defined as arctan(I/Q);
        calculate a phase error between the first sample and the second sample;
        use the phase error to calculate a carrier frequency offset;
        compensate for a difference between the known frequency and an actual frequency of the tone by modifying a plurality of stored I and Q signals using the calculated carrier frequency offset to create a plurality of compensated I and Q signals; and
        using the plurality of compensated I and Q signals as inputs to an AoX algorithm.
9. The device of claim 8, wherein the memory device further comprises instructions, which when executed by the processing unit, create the plurality of stored I and Q signals by:
    sampling the CTE a plurality of times during at least a portion of the guard period and the reference period and computing the phase of each sample, using a sample rate that is at least 8 times the known frequency;
    calculating a phase of each sample and compiling the plurality of the phases to form a phase signal;
    computing an initial frequency ($F_{init}$) of the tone based on the phase signal;

using $F_{init}$ to determine a calculated initial carrier frequency offset; and modifying the plurality of sampled I and Q signals using the calculated initial carrier frequency offset to create the plurality of stored I and Q signals.

10. The device of claim 9, wherein the initial frequency is calculated by determining a slope of the phase signal.

11. The device of claim 9, wherein the initial frequency is calculated by determining a period of the phase signal.

12. The device of claim 8, wherein the carrier frequency offset is determined by dividing the phase error by a time between the first sample and the second sample, wherein the phase error is defined as a difference in the phase of the first sample and the second sample, less 90°.

13. The device of claim 8, wherein the memory device further comprises instructions, which when executed by the processing unit: store the sampled I and Q signals to create the plurality of stored I and Q signals.

14. A device to calculate an angle of arrival or an angle of departure, comprising:
  a wireless network interface, comprising a plurality of antenna elements, wherein the wireless network interface receives an incoming signal and generates an I signal and a Q signal;
  a processing unit;
  a memory device, comprising instructions, which when executed by the processing unit, enable the device to:
    receive a packet that includes a constant tone extension (CTE), wherein the CTE comprises a tone having a known frequency and wherein the CTE comprises a guard period, a reference period, a plurality of switch slots and a plurality of sample slots;
    sample the CTE during each sample slot to obtain a plurality of sampled I and Q signals, wherein samples are collected using different antenna elements, and wherein a number of sample slots is greater than a number of antenna elements, such that one antenna element is used to sample at least a first sample and a second sample from different snapshots;
    calculate a phase of the first sample and the second sample, wherein the phase is defined as arctan(I/Q);
    calculate a phase error between the first sample and the second sample;
    use the phase error to calculate a carrier frequency offset;
    compensate for a difference between the known frequency and an actual frequency of the tone by modifying a plurality of stored I and Q signals using the calculated carrier frequency offset to create a plurality of compensated I and Q signals; and
    using the plurality of compensated I and Q signals as inputs to an AoX algorithm.

15. The device of claim 14, wherein the memory device further comprises instructions, which when executed by the processing unit, create the plurality of stored I and Q signals by:
  sampling the CTE a plurality of times during at least a portion of the guard period and the reference period and computing the phase of each sample, using a sample rate that is at least 8 times the known frequency;
  calculating a phase of each sample and compiling the plurality of the phases to form a phase signal;
  computing an initial frequency ($F_{init}$) of the tone based on the phase signal;
  using $F_{init}$ to determine a calculated initial carrier frequency offset; and
  modifying the plurality of sampled I and Q signals using the calculated initial carrier frequency offset to create the plurality of stored I and Q signals.

16. The device of claim 15, wherein the initial frequency is calculated by determining a slope of the phase signal.

17. The device of claim 15, wherein the initial frequency is calculated by determining a period of the phase signal.

18. The device of claim 14, wherein the memory device further comprises instructions, which when executed by the processing unit: store the sampled I and Q signals to create the plurality of stored I and Q signals.

* * * * *